Sept. 18, 1951 H. O. PETERSON 2,568,408

FREQUENCY SHIFT DIVERSITY TRANSMISSION SYSTEM

Filed May 17, 1947 3 Sheets-Sheet 1

INVENTOR.
Harold O. Peterson
BY Harry Tunick
ATTORNEY

INVENTOR.
Harold O. Peterson
BY Harry Tunick
ATTORNEY

Sept. 18, 1951 H. O. PETERSON 2,568,408

FREQUENCY SHIFT DIVERSITY TRANSMISSION SYSTEM

Filed May 17, 1947 3 Sheets-Sheet 3

INVENTOR.
Harold O. Peterson
BY Harry Tunick
ATTORNEY

Patented Sept. 18, 1951 2,568,408

UNITED STATES PATENT OFFICE 2,568,408

FREQUENCY SHIFT DIVERSITY TRANSMISSION SYSTEM

Harold O. Peterson, Riverhead, N. Y., assignor to Radio Corporation of America, a corporation of Delaware Application May 17, 1947, Serial No. 748,809

1 Claim. (Cl. 250—8)

Figures 1, 2:
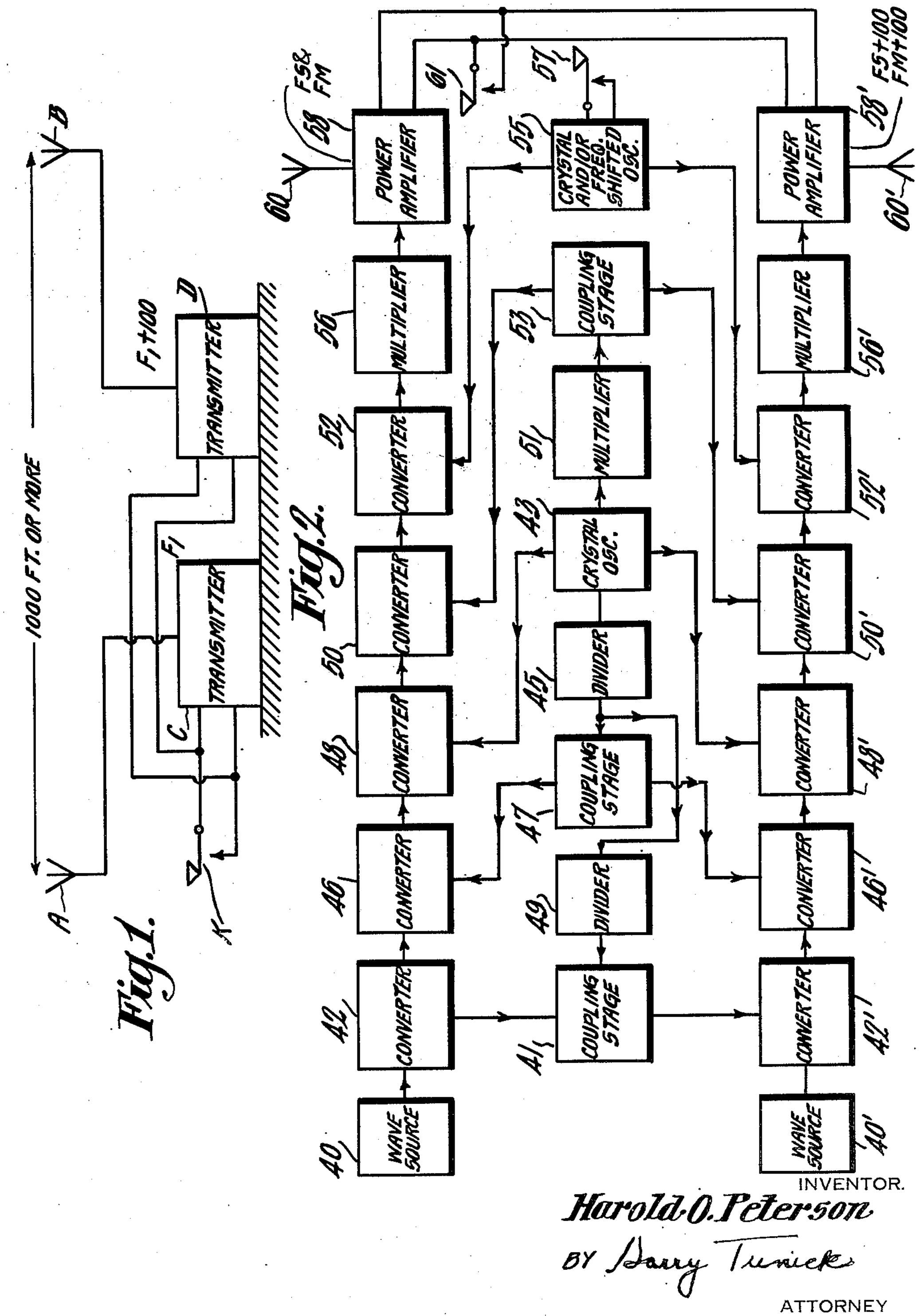

This application concerns radio transmitters and in particular, diversity transmitters. By the term "diversity transmitter," applicant includes diversification by spacing of the antennas, by use of different frequencies of transmission and diversification by antennas of different polarization. The benefits derived by diversification are well known in the art and need not be enumerated here.

Spaced diversity has been generally effective in application at the receiving stations. In more crowded locations where spacing of the antenna systems is not feasible, antenna polarization diversity has been applied but the results have usually not been as good as those obtained with space diversity because the horizontal receiving antenna has generally had less local noise induced in it than the vertical antenna. Thus, when the signal is selected from the vertical antenna, more noise appears in the receiver output. There are also many situations where it is not convenient to provide two receiving antennas. An example of such a situation is the case of communications between a shore station and ships or between a landing field and planes. Another example is a system where communication is to be carried on between a large radio central station and smaller outlying stations. In these situations, it is not practicable to have high power or elaborate equipment at one end of the circuit and yet the other end of the circuit may have high power and other devices which improve the circuit reliability. Thus, the shore station or the radio central may use diversity reception while the ship or the smaller outlying station may receive with only one antenna and a relatively simple receiver. In the case of aircraft, weight is a further limitation on the installation of elaborate diversity receiver systems.

In this kind of a communication system, the shore station or radio central should use high power, say on the order of several tens or hundreds of kilowatts effective, counting the antenna gain. It is also desirable to make use of some form of diversity principle at the transmitter. In the past, some telegraph transmitters have been tone modulated for this purpose so that they radiate simultaneously several side band frequencies spaced on the order of 800 kilocycles apart. This is a form of frequency diversity and its effectiveness depends mainly on the path length differences that are present in the transmission medium at a given time. This method also uses a considerable band width of frequency spectrum and is not convenient to apply in the case of frequency shift telegraphy.

The primary object of my invention is to provide space diversity or a combination of space and frequency diversity in the transmission system of a communication system. Then a simple antenna and receiver system will be effective for use at the receiving station. This is of considerable advantage where the communication system's terminal is, as stated above, on a ship or on an airplane or at an outlying station.

In describing my invention in detail, reference will be made to the attached drawing where Fig. 1 illustrates diagrammatically, a diversity transmitter, arranged in accordance with my invention. In this embodiment, the antennas and frequencies are spaced to reduce fading at the receiver. This diversity transmitter is illustrated more in detail in Fig. 2.

Figure 3:
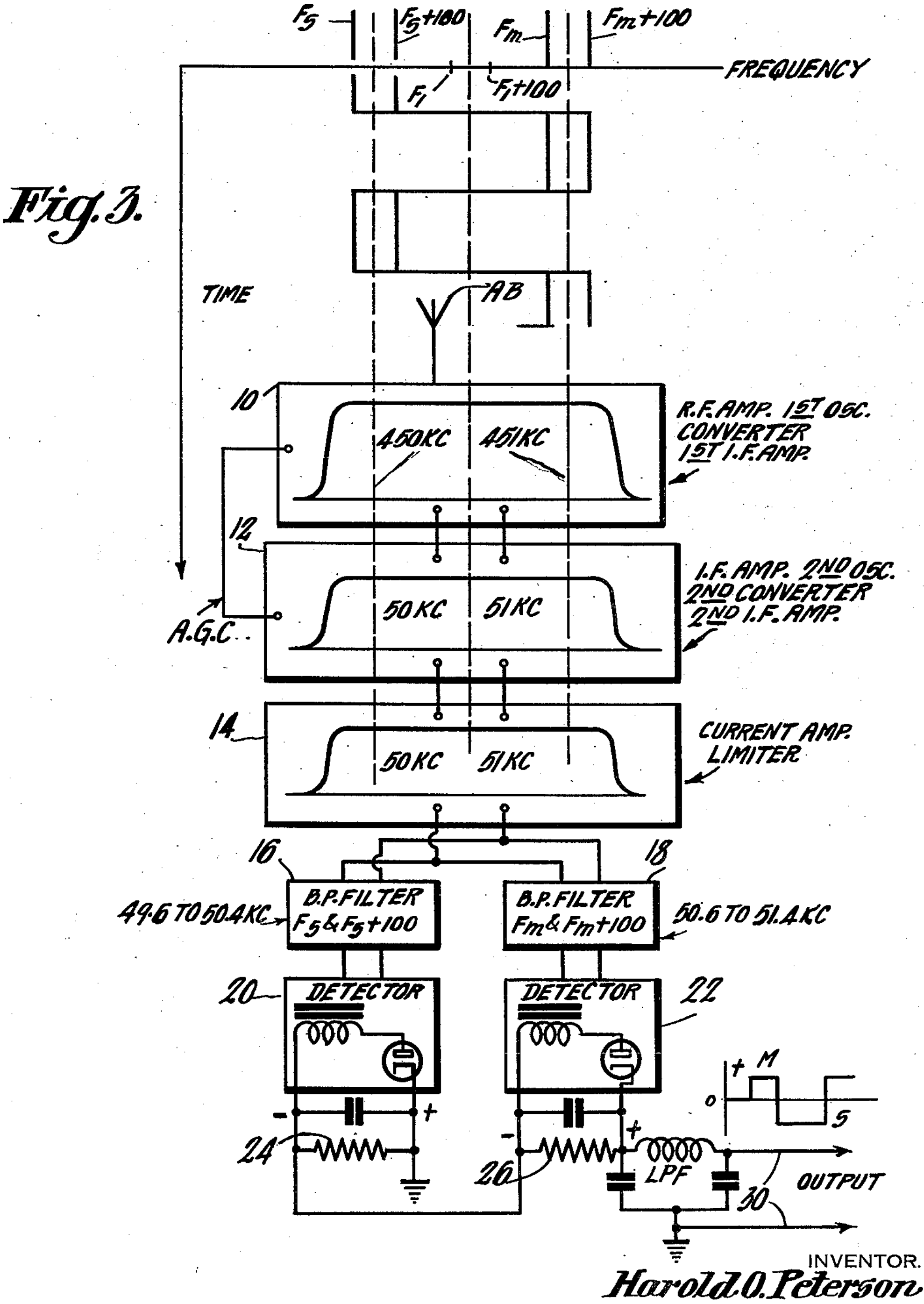

Fig. 3 illustrates by vector, curve and diagram, the character of the transmission from the transmitter of Fig. 1 and also illustrates schematically a receiver arranged to respond to the said transmission.

Figure 4:
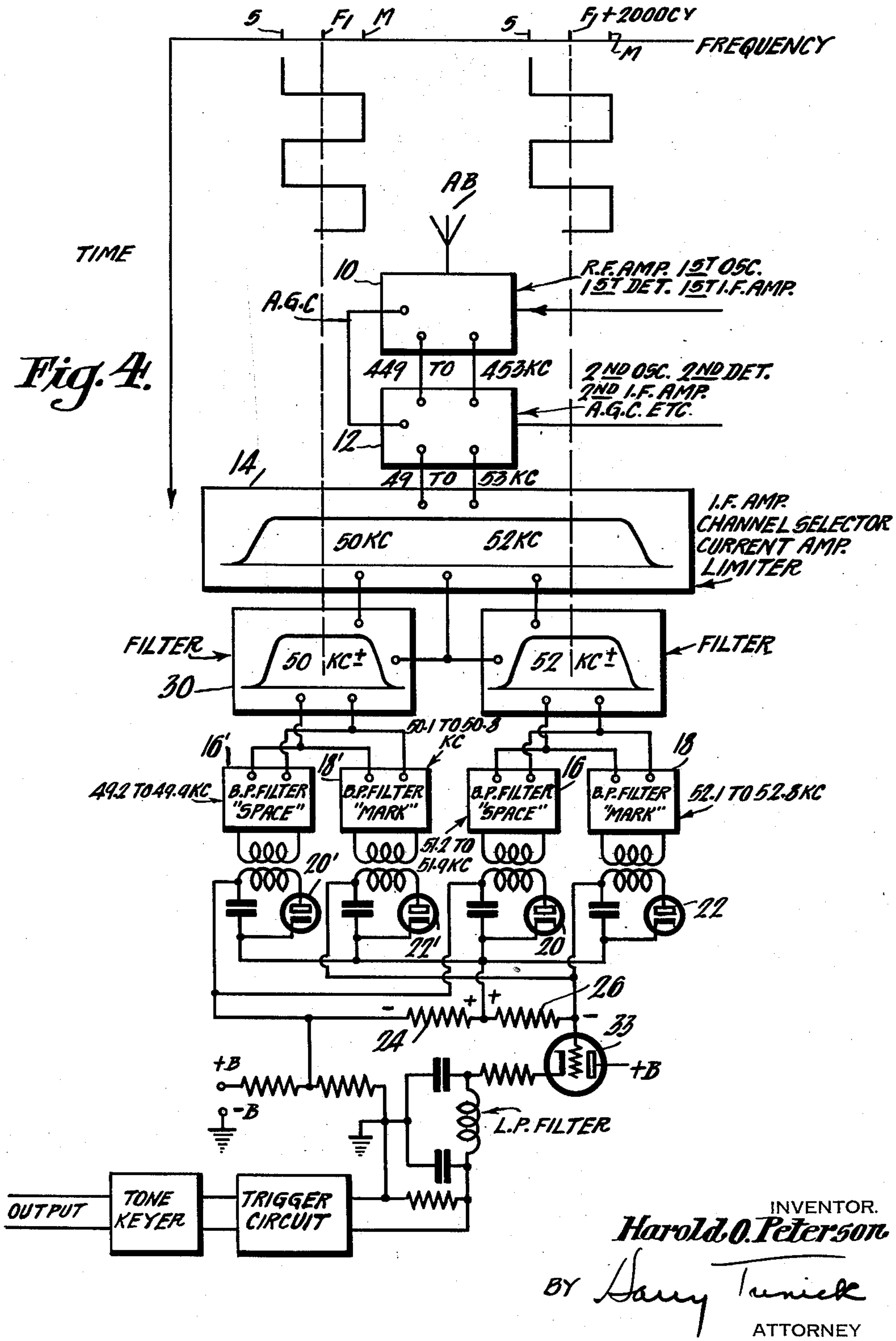

Fig. 4 illustrates diagrammatically a modification of the receiver of Fig. 3, and the receiver of Fig. 4 is used for the reception of transmission from the transmitter of Figs. 1 and 2 when the mode of operation is modified as described hereinafter. Fig. 4 also illustrates by vector and curve the characteristic of the wave generated by the transmitter of Figs. 1 and 2 when the mode of operation is modified.

In the embodiment of Fig. 1, two aerial systems A and B preferably spaced 1,000 feet or more apart horizontally, are connected to two transmitters C and D which radiate the same message on carriers of two different wave lengths. For example, transmitter C and antenna A might have a carrier frequency of 12,444,400 cycles and transmitter D and aerial B might operate at 12,444,500 cycles. Both transmitters are keyed in accordance with a message to be transmitted by operation of key K. The showing in Fig. 1 has been simplified but the embodiment illustrated here has been shown in detail in Fig. 2. The key K may turn the two transmitted frequencies on and off but preferably shifts the frequencies thereof between two frequencies representing mark and space respectively. For example, the key K might shift the frequency of the carrier F1 by ±450 cycles per second, and the frequency F1 +100 cycles by a like amount. Then, a wave would be transmitted as illustrated in Fig. 3, the frequency of which would shift about F1 by ±450 cycles and about F1 +100 by ±450 cycles. The receiver for such a wave may include an anenna AB coupled to a radio frequency amplifier, first oscillator, a frequency converter and a first intermediate frequency amplifier, all included with other necessary elements known in the prior art in unit 10. In this unit, the radio frequency wave is amplified and reduced in frequency to a first intermediate frequency, of the order of say 450 kc., for example. The selective circuits in unit 10 are arranged to pass uniformly the necessary band of frequencies. For example, the unit 10 includes selective circuits passing a band of frequencies between 449 and 452 kc. This band is greater than the band covered by the carrier and side bands described above where on carrier is 100 cycles in frequency above the other and both carriers are shifted in frequency ±450 cycles.

The output of the radio frequency amplifier and first intermediate frequency amplifier in unit 10 is fed to a second intermediate frequency amplifier system in unit 12. This apparatus includes a second oscillator, second frequency converter and second IF amplifier with selective circuits sufficient to pass a band of frequencies including the carriers and side bands described hereinbefore. The second oscillator might have a frequency of about 400 kilocycles, in which case the second intermediate frequency output of unit 12 falls in a band between 49 and 52 kc. Automatic gain control connections are used as illustrated diagrammatically in the figure by the connection labeled A. G. C. between the units 10 and 12. Unit 12 then includes a rectifier with a load impedance and a filter capacitor to supply the gain control potential. The second intermediate frequency currents, shifted in frequency by the signals, are fed to a third unit 14 wherein current amplitude limiting takes place. This limiter again has a band pass characteristic as illustrated in the said rectangle and selective coupling circuits such as to pass the two carriers and their side bands uniformly to the band pass filter circuits in units 16 and 18. These band pass filters pass the mark and space frequencies respectively. In the example given, the filter 16 is to have a mean band pass characteristic at 50 kc. per second and have a band width of about 800 cycles. The band pass filter 18 is to have the same characteristics except that the mean frequency of its pass band is to be at say 51 kc.

The keyed intermediate frequency energies passed by band pass filters 16 and 18 are supplied to the detectors 20 and 22 wherein the signals are demodulated. The detectors in 20 and 22 have their outputs connected with load resistors 24 and 26. The load resistors are connected in such a manner that the differential of the detector outputs is supplied to the filter circuit 30 and thence to a recording apparatus directly or by way of a tone keyer, trigger circuit or amplifier.

The circuits in 10, 12 and 14 have not been described in detail herein because circuits and apparatus appropriate for use in these units is known in the art. For example, the circuits and apparatus as disclosed in U. S. application Serial #632,978 filed December 5, 1945, may be used here. Said application has ripened into Patent No. 2,515,668, July 18, 1950.

The detectors in 20 and 22 may be substantially conventional. The purpose of these detectors is to demodulate intermediate frequency waves which are turned on and off even though the transmission be of the frequency shift type. This is because the marking characteristics and the spacing characteristics never appear simultaneously but appear alternatively. For example, when mark is in the band pass filter 18, band pass filter 16 is getting no signal and when space, for example, is in band pass filter 16, no signal is flowing in the filter 18. The mark pulses of I. F. are then passed direct to detector 22 and when present, produce a voltage drop in load resistor 26, which is polarized as marked on the drawings. When space is present, in the input to detector 20, rectification of the pulses of IF carrier in 20 takes place to produce across the load resistor 24, a potential which is polarized as shown on the drawings. The resistors 24 and 26 are coupled in an opposed sense (note that the developed voltages are alternative) and one end of resistor 24 is grounded so that at the right end of resistor 26 is developed a potential which swings plus when detector 22 supplies the output and through zero to a minus value when detector 20 supplies the output. A low pass filter 30 may be included in the output circuit to suppress any 100 cycle or higher components appearing in the outputs of detectors 20 and 22.

A diversity transmitter arranged in accordance with my invention is shown more in detail in Fig. 2 of the drawings. This transmitter is to generate a wave as illustrated at the top of Fig. 3 wherein a carrier is to be shifted between two frequencies FS representing "space" and FM representing "mark" and a second carrier is to be shifted between two frequencies FS+100 representing "space" and FM+100 representing "mark." Two sources of oscillations 40 and 40′ slightly different in frequency but of constant frequency, supply output to two converters 42 and 42′ which are also excited by oscillatory energy of fixed frequency developed in a coupling amplifier stage 41. This oscillatory energy in 41 of fixed frequency may be derived from a fixed source of oscillatory energy at 43. The oscillator 43 may be of the crystal controlled or other stabilized type and oscillatory energy from this source 43 may be fed to a frequency divider in unit 45 and from the divider in unit 45 to an amplifier and coupling stage in unit 47 and also to an additional frequency divider 49 which supplies the oscillations of divided frequency to coupling or amplifying stage 41. The sum frequency may be taken from the output of the converters 42 and 42′ and fed to second converters 46 and 46′ which are also supplied with oscillations for mixing purposes from the coupling or amplifying stage 47. The outputs of mixers 46 and 46′, say the upper side bands, are fed to third converters 48 and 48′ coupled with the fixed frequency source of oscillations 43. Again the upper side bands are selected from the outputs of 48 and 48′ and fed to additional converters 50 and 50′ wherein these oscillations are mixed with oscillations from a frequency multiplier 51 coupled with the fixed frequency source 43. This multiplier 51 develops energy of the multiple frequency and feeds the same to a coupling and/or amplifying stage 53 which in turn feeds the energy of fixed and multiplied frequency to the converters 50 and 50′. The upper side bands at the outputs of these converters are selected and fed to final converter stages 52 and 52′. These converters are also excited by frequency shifted oscillatory energy of fixed frequency from source 55. Source 55, for example, may include a crystal controlled oscillator and an oscillator, say of less frequency, which is keyed, as indicated at 57, in frequency in accordance with a signal and is used to beat with energy from the crystal oscillator 55 to supply a sum frequency output which is correspondingly shifted in frequency. On the other hand, a simple crystal oscillator, the frequency of which is shifted by keying, may be used in 55. In any event, the oscillations of shifted frequency are supplied to the converters 52 and 52′, and a side band selected for multiplication in units 56 and 56′. In the example given, the upper side band is selected. The frequency shifted oscillator energies are multiplied in units 56 and 56′ and fed to amplifier 58 and 58′ and thence to the two antennas 60 and 60′ for radiation. When frequency shifted telegraphy is used, the keying is done at 57 as described hereinbefore. If on-off telegraphy keying is to be used, then the frequency of the wave energy at 55 may be left constant and the amplifiers 58 and 58′ may be keyed on and off by a key connected as shown at 61. For example, the key at 61 might operate a relay in the bias circuit of the power amplifier so as to cut the transmitter off when open and to turn the transmitter on when the key is closed.

The oscillatory sources, the converters, the frequency multipliers and so forth used here may be conventional, except where otherwise described above, and have been shown as rectangles for sake of simplicity and clearness. To carry through the example of frequencies which may be used, given hereinbefore, the source 40 may have a frequency of 100 cycles and the source 40′, a frequency of 125 cycles per second. Then the source 43 may be of 100 kilocycles which, when divided by 10 in unit 45 and 10 in unit 49, supplies energy of 1 kc. at 41 and of 10 kc. at 47 so that the upper side band out of unit 42 is at 1100 cycles per second, the upper side band out of unit 42′ at 1125 cycles per second and the upper side band out of units 46 and 46′ at 11,100 and 11,125 cycles per second respectively. The upper side bands out of units 48 and 48′ are of 111,100 and 111,125 cycles per second respectively and the upper side bands out of units 50 and 50′ are 1,111,100 and 1,111,125 cycles per second respectively, if unit 51 multiplies by a factor 10. The upper side bands out of units 52 and 52′ are 3,111,100 and 3,111,125 cycles per second respectively, if the rest frequency of oscillator 55 is 2000 kilocycles; and when multiplied by factors of say 4 in units 56 and 56′, the wave outputs from antennas 60 and 60′ are 12,444,400 and 12,444,500 cycles per second respectively. Note that energy is radiated on "space" at 2 frequencies, separated by 100 cycles and energy is radiated on "mark" at 2 frequencies, separated by 100 cycles and further, that "mark" and "space" frequencies may be separated by say a total of 900 cycles as explained hereinbefore.

Where desired, the two frequencies transmitted by the system of Fig. 2 may be separated by more than 100 cycles per second. For example, a frequency separation of 2,000 cycles may be used. Then a receiver as illustrated in Fig. 4 is used to receive the transmitted wave. Such a transmitted wave is represented graphically at the top of Fig. 4. The frequencies F1 and F1+2,000 are each shifted in accordance with signals between "space" and "mark" frequencies which may, as in the example given, be shifted ±450 cycles or a total shift of 900 cycles per second. The "mark" and "space" frequencies of each of the transmitted carriers are picked up by the antenna AB and fed to a unit 10 as in Fig. 3. The first intermediate frequency energy at the output of unit 10 goes to a unit 12 similar to the correspondingly numbered unit of Fig. 3. Here the band pass characteristic is about as in Fig. 3 and is wide enough to include a band starting below 450 and extending above 452 kilocycles per second. The second heterodyning process is carried out in unit 12 by beating the output of unit 10 with energy of a frequency such that the current amplitude limiter 14 is supplied by carriers roughly of the order of 50 and 52 kc. per second respectively which in turn are keyed in accordance with the signals. The circuits in this second intermediate amplifier select this output and are of a characteristic such that the respective carriers and their side bands essential for signal reproduction are passed uniformly.

In this embodiment, mark and space frequencies are selected in filters 16 and 18 and 16′ and 18′ which may be similar in many repects to the corresponding filters of Fig. 3. Filters 18 and 18′ pass mark frequencies whilst filters 16 and 16′ pass space frequencies. The mark frequency currents are rectified by rectifiers 22 and 22′ with outputs connected in parallel across load resistor 26 whilst the space frequency currents are rectified by rectifiers 20 and 20′ connected in parallel across load resistor 24. Thus when either the 50 or the 52 kc. branch is passing a "mark" frequency, a potential is generated across resistor 26 and when either of said branches is passing a "space" frequency a potential is generated across resistor 24. Resistors 24 and 26 are connected differentially in series so that the overall potential on "mark" is polarized opposite from what it is on "space." Thus in Fig. 4, the grid of tube 33 is driven more negative on "mark" and more positive on "space."

The use of a frequency separation on the order of 2,000 cycles instead of 100 cycles is particularly desirable when the circuit is to be operated at a high speed of keying. The arrangement using a separation of about 100 cycles between the frequencies radiated by the two spaced antennas is satisfactory for telegraph speeds on the order of 60 words per minute, whilst the arrangement with a separation of about 2,000 cycles as shown in Fig. 4 is satisfactory at speeds up to about 240 words per minute. The arrangement with the 100 cycle separation needs a low pass filter with a cut-off frequency below 100 cycles to remove the 100 cycle beat between the two simultaneously radiated frequencies, which in turn, limits the keying speed. With the large separation, on the order of 2,000 cycles, the cut-off frequency of the low pass filter can be made much higher, thus allowing for higher keying speeds.

To transmit a wave of this nature, I may use the system in Fig. 2. In the example taken, to provide at the output a 2,000 cycle spread between F1 and the other carrier F1+2,000, the source 40′ may be operating at 600 cycles per second instead of 125 cycles per second. Then with no other change in the frequencies of the various sources and in the multiplication and division factors, the carriers at the antenna 60 will be equal to 12,444,400 cycles per second while the carrier at antenna 60′ will be equal to 12,446,400.

Whilst the circuits shown herein are designed to handle frequency shift signals primarily, it is obvious the same benefits of spaced antenna diversity can be obtained with on/off keying. In the case of on/off keying essentially the same receivers as are now used for on/off keyed signals can be used.

What is claimed is:

A diversity transmitting system comprising a pair of transmitting antennas spaced apart horizontally a distance substantially equal to many hundreds of feet or more, a generator of oscillatory energy of a first high frequency coupled to and continuously feeding wave to one of said antennas, a second generator of oscillatory energy of a second high frequency simultaneously and continuously feeding waves to the second of said antennas, said first and second frequencies differing by an audible tone frequency which frequency is less than that required for satisfactory frequency diversity reception, frequency shifting apparatus for shifting the frequency of the wave fed to each antenna from its corresponding generator an amount within the audible range, said frequency shifting apparatus operating to shift the frequencies of said waves in unison and in accordance with telegraphic marking and spacing signals, whereby said antennas radiate simultaneously a first pair of waves differing from each other by said tone frequency to represent a mark and alternatively a second pair of waves differing from each other by said tone frequency and also differing in frequency from the respective frequencies of said first pair of waves by said amount within the audible range, to represent a space.

HAROLD O. PETERSON.

REFERENCES CITED

The following references are of record in the file of this patent:

UNITED STATES PATENTS

| Number | Name | Date |
|---|---|---|
| 1,641,431 | Horton | Sept. 6, 1927 |
| 1,803,504 | Hansell | May 5, 1931 |
| 1,805,918 | Meissner | May 19, 1931 |
| 1,856,376 | De Saivre | May 3, 1932 |
| 1,915,578 | Osnos | June 27, 1933 |
| 1,987,889 | Beverage | Jan. 15, 1935 |
| 2,028,860 | Beverage | Jan. 28, 1936 |
| 2,067,432 | Beverage | Jan. 12, 1937 |
| 2,103,847 | Hansell | Dec. 28, 1937 |
| 2,118,917 | Finch | May 31, 1938 |
| 2,159,647 | Alford | May 23, 1939 |
| 2,253,867 | Peterson | Aug. 26, 1941 |
| 2,282,102 | Tunick | May 5, 1942 |
| 2,358,382 | Carlson | Sept. 19, 1944 |
| 2,383,126 | Hollingsworth | Aug. 21, 1945 |
| 2,384,456 | Davey | Sept. 11, 1945 |
| 2,413,543 | Carlson | Dec. 31, 1946 |
| 2,426,295 | Born | Aug. 26, 1947 |
| 2,461,456 | Usselman | Feb. 8, 1949 |

FOREIGN PATENTS

| Number | Country | Date |
|---|---|---|
| 301,326 | Great Britain | Mar. 28, 1929 |